C. C. CONKLING, DEC'D.
L. C. CONKLING, EXECUTRIX.
REINFORCING BAR FOR CONCRETE.
APPLICATION FILED APR. 8, 1918.
1,364,182.
Patented Jan. 4, 1921.
4 SHEETS—SHEET 1.
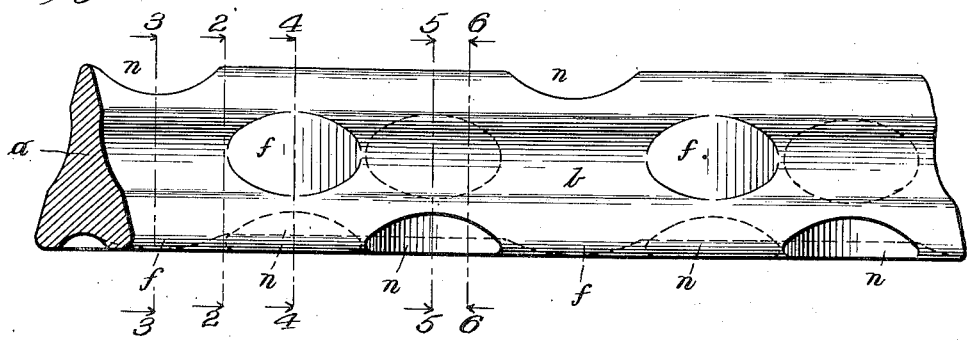
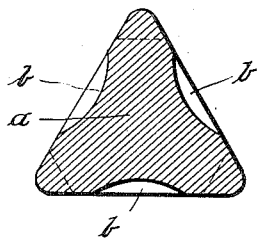
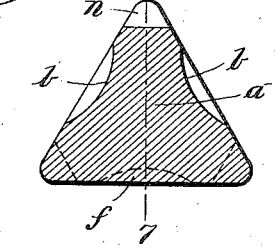
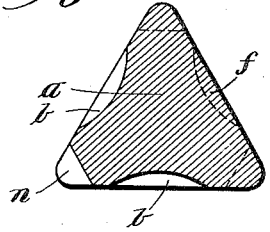
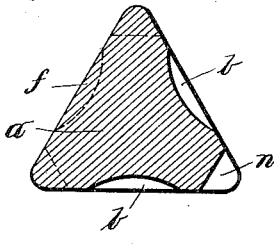
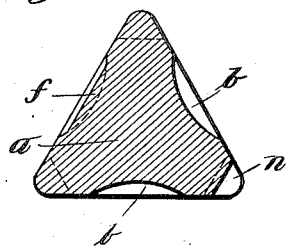
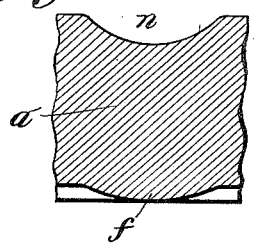
Inventor
Cloud C. Conkling,
Lucile C. Conkling, Executrix
By her Attorney
Alfred Wilkinson C. C. CONKLING, DEC'D.
L. C. CONKLING, EXECUTRIX.
REINFORCING BAR FOR CONCRETE.
APPLICATION FILED APR. 8, 1918.
1,364,182.
Patented Jan. 4, 1921.
4 SHEETS—SHEET 3.
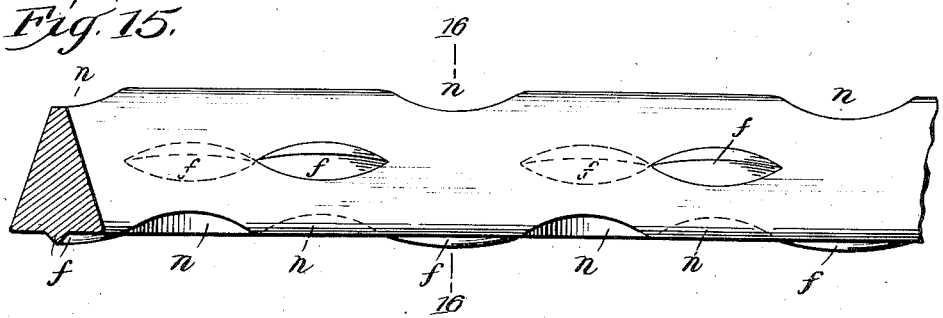
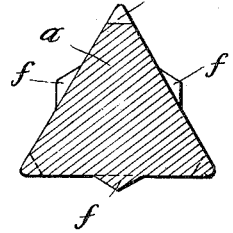
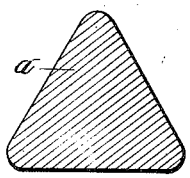
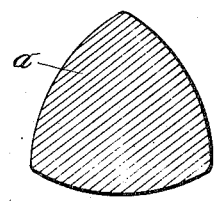
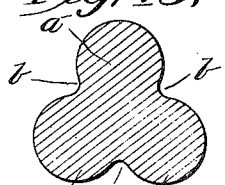
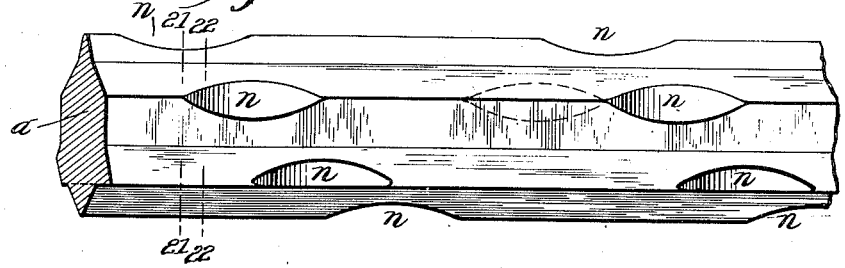
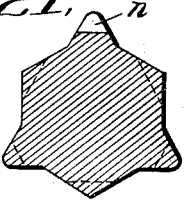
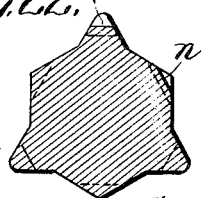

C. C. CONKLING, DEC'D.
L. C. CONKLING, EXECUTRIX.
REINFORCING BAR FOR CONCRETE.
APPLICATION FILED APR. 8, 1918.
1,364,182.
Patented Jan. 4, 1921.
4 SHEETS—SHEET 4.
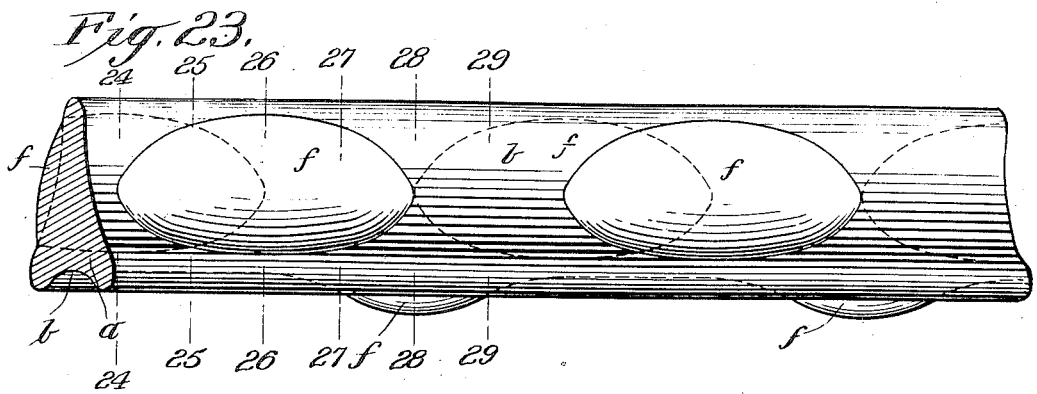
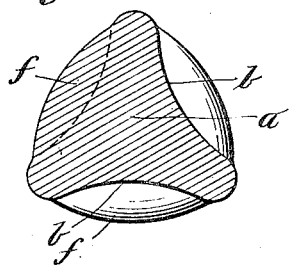
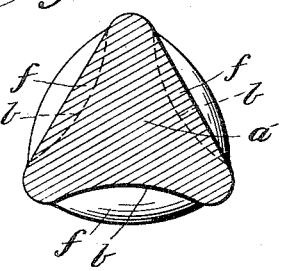
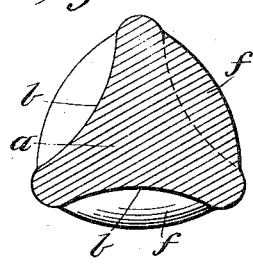
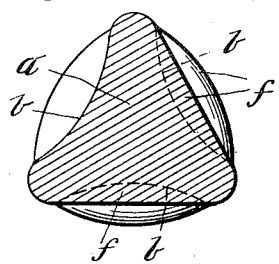
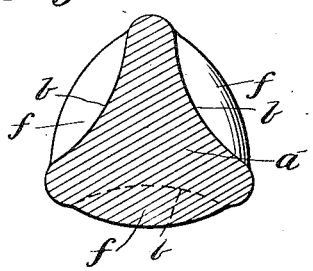
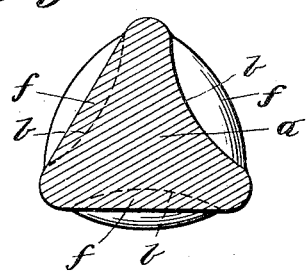
Inventor
Cloud C. Conkling,
Lucile C. Conkling, Executrix
By her Attorney
Alfred Wilkinson

UNITED STATES PATENT OFFICE.

CLOUD C. CONKLING, DECEASED, LATE OF BUFFALO, NEW YORK, BY LUCILE C. CONK-LING, OF BUFFALO, NEW YORK, EXECUTRIX, ASSIGNOR TO LACKAWANNA STEEL COMPANY, OF LACKAWANNA, NEW YORK, A CORPORATION OF NEW YORK.

REINFORCING-BAR FOR CONCRETE.

1,364,182.     Specification of Letters Patent.     Patented Jan. 4, 1921.

Application filed April 8, 1918. Serial No. 227,392.

*To all whom it may concern:*

Be it known that CLOUD C. CONKLING, deceased, a citizen of the United States, lately residing at Buffalo, in the county of Erie and State of New York, did invent new and useful Improvements in Reinforcing-Bars for Concrete, of which the following is a specification.

This invention relates to metal bars for reinforcing concrete and consists in a bar which is not only new in form and in structure but in the production of which he has applied principles never before utilized in such bars so far as I am aware.

The bar has for its basis the equi-lateral triangle, for a prism having such a triangle for its cross section has certain advantages for use in connection with concrete reinforcement, never before observed as I believe. Starting with such a prism, he has provided the same with deformations on its three sides which I call "fillets" and "notches" peculiarly arranged, that is each with its greatest length extending longitudinally and parallel to the longitudinal axis of the bar. In the preferred embodiment of my invention these deformations for providing the required mechanical bond in the longitudinal direction, consist of both fillets, or projections, and notches or depressions, and are arranged in corresponding and compensating relation, that is the notches are formed in the edges and in a spiral series and exactly opposite each notch there is centrally arranged on the opposite side of the bar therefrom, a fillet of corresponding volume to compensate therefor so that the bar is symmetrical and of equal cross-sectional area at all points. Preferably each side of the bar is formed with a straight longitudinal channel which latter forms a desirable bed for the fillets and coöperates therewith, as hereinafter described, each fillet being equivalent in volume to and compensating for a notch on the opposite edge.

The general principles relating to reinforced concrete structures are well known but to understand the principles involved and applied in the production of the bar herein disclosed and the advantages obtained thereby these principles must be briefly referred to.

Concrete is strong in compression but weak in tension and shear. To resist these weaknesses, steel reinforcing rods or bars are provided and, so far as horizontal elements are concerned, are arranged at or near the bottom of the beam where the tensional stresses particularly exist or are at the maximum.

To get the full value from such reinforced beam, the concrete and steel must act together analogous, so far as can be accomplished, to homogeneous material, and the concrete must be firmly bonded to the steel at all points on the rods. This bond between the concrete and the steel consists of, or depends on three factors, first, the adhesion between the two materials, second the friction with the surface, preferably rough, of the steel, after the adhesive bond is overcome and the concrete begins to slip, and third, the mechanical bond created by substantial irregularities in the bars, that is projections or depressions. Therefore the bar having the greatest perimeter, compared to its cross sectional area, will afford the greatest adhesive and frictional resistance per lineal unit of bar and per pound of weight.

The new bar has a high superficial area compared to its cross sectional area and I believe the highest superficial area possible consistent with sufficient projections and depressions to effect a strong mechanical bond for it will be understood that the projections and depressions reduce the superficial area somewhat, as compared to a plain bar, but are necessary to produce the mechanical bond as aforesaid.

Therefore I believe that this bar is superior in all of said three factors to any bar heretofore devised or produced, that is on account of its comparatively large perimeter in relation to its sectional area, the adhesion and friction are high on account of the arrangement of the fillets and notches there is a strong mechanical bond after slip.

The bar has for its basis the plain equilateral triangle for such triangle is the cross section of a prism having three equal sides and this form gives the greatest perimeter of section compared to other sections. It is well understood that a circle has the smallest perimeter compared to its cross sectional area. As we depart from the circle the perimeter increases in proportion to the sectional area first that of a many sided figure such as the octagon, then the perimeter of the hexagon is larger in comparison than the perimeter of the octagon, the square bar than the hexagonal bar, and finally the highest, as compared to its cross sectional area, comes the perimeter of the equilateral triangle. Expressing these proportions numerically the perimeter of an equilateral triangular bar, having a cross sectional area of one square inch is 4.55, whereas that of a square bar is 4. of an oval, having the same cross section 3.81, of a hexagonal bar 3.72 an octagonal bar is 3.64 and a plain round bar is 3.54.

The perimeter of a plain equilateral triangular bar of course is somewhat reduced by providing it with superficial irregularities as aforesaid but in my perfected bar the perimeter is still substantially higher than that of any of the other forms referred to and higher in relation to its section of area than the perimeter of any other form of reinforcing bar in practical use.

Starting with a triangular prism as a basis, each side of the bar is preferably formed with a continuous straight longitudinal channel from end to end which affords a desirable bed for the projections or fillets. The volume of each fillet compensates for the corresponding loss of volume in a notch and the notches coöperate with the fillets to insure a high mechanical bond. Therefore the notches and fillets so arranged with reference to each other, produce a bar of uniform cross sectional area and uniform tensional strength from end to end which is an essential requirement of reinforcing bars no matter what their shape.

The deformations described are of such comparative size, location and alinement as to offer the required bond, without detracting from the tensional strength, of the bar, as each projecting element of the bar assists in resisting any longitudinal tensional stresses which may be developed in the bar due to its load, the projecting elements at the same time compensating in tensional strength, for the metal taken out in the reentering elements, thus causing the bar to have the same tensional strength in direct pulling test, as a plain bar of same area and composition.

From the fact that in the preferred form there are three sides and a series of fillets on each side no two being opposite or overlapping each other it results that the space between the adjacent fillets of each series is exactly equal to the length of two fillets whereby in each channel are formed, between the adjacent fillets, long pockets adapted to receive a large quantity of concrete or large particles thereof thus preventing the bar from turning or twisting in the concrete.

It will be observed that while the fillets and notches of the bar are arranged in a certain spiral sense yet their resisting surfaces are all normal or at right angles to the longitudinal axis of the bar whereby any tendency of the bar to turn or twist is overcome.

By this construction he has produced a bar which I believe is superior to any other heretofore devised or now in use—from its comparatively large perimeter the adhesion and friction are high, and on account of the arrangement of fillets and notches the mechanical bond is strong. It is economical because from its shape its efficiency, in proportion to its weight, is high. Also, when arranged horizontally in the lower portion of the concrete element, its neutral axis and center of gravity are low. It is of a shape which may be easily and economically rolled and is convenient to transport and handle.

The invention is illustrated in the drawing herewith wherein there is shown the preferred form of the invention and various modifications thereof, all employing the broader features thereof, and also disclosing many modifications in the form and arrangement of the deformations.

Referring to the drawings the first seven figures illustrate the preferred form. Figure 1 is a side elevation and sectional view of the bar. Figs. 2, 3, 4, 5 and 6 are cross-sectional views thereof on the correspondingly numbered lines and Fig. 7 is a partial longitudinal section on line 7—7 of Fig. 3. The remaining figures show various modified and equivalent forms or embodiments of my invention. Therein, Figs. 8 to 12 illustrate a desirable modification. Fig. 8 is a view corresponding to Fig. 1, Figs. 9, 10 and 11 are cross sectional views on the lines correspondingly numbered and Fig. 12 is a partial longitudinal view on line 12—12 of Fig. 11. Figs. 13 and 14 are side elevation and cross-sectional views of a form but slightly modified from the preceding. Figs. 15 and 16 are similar views of showing a modification wherein the body of the bar is formed with straight sides. Figs. 17, 18 and 19 are cross-sectional views of forms of bars of equilateral triangular type which are preferably formed with suitably roughened surfaces. Figs. 20 to 29 illustrate further types of bars embodying my invention and wherein either notches or fillets are alone employed as the deformations and suitably arranged to maintain the uniform cross-section of the bar. Fig. 20 is a side elevation illustrating a desirable modification wherein notches or depressions are employed as deformations and Figs. 21 and 22 are cross-sections thereof on the lines indicated. Fig. 23 is a side elevational view employing fillets only as the deformations of a substantially equilateral triangular bar and Figs. 24 to 29 are cross-sectional views on the lines correspondingly numbered.

Referring first to Figs. 1 to 7, $a$ indicates the equilateral triangular body adopted for the reasons given as the basis of, or for development into, the complete and perfected bar. Centrally of each side thereof a longitudinal groove or depression $b$ of slight depth is provided. At intervals in these channels are arranged the fillets $f$ forming a longitudinal series in each channel spaced as shown and in each edge or apex of the body notches $n$ are so formed that in each edge there is a longitudinal series of notches spaced as shown to correspond to the spacing of the fillets $f$ and with the notches and fillets in opposite relation. As described these fillets $f$ and notches $n$ provide the deformations to give a strong bond between the concrete and the bars to resist relative longitudinal movement and the fillets and notches are desirably of a size to correspond in volume so as to maintain a uniform cross-sectional area of the bar at all points.

In this preferred form of bar, as shown, the formation with the channels in the sides is particularly desirable in that the concavity adds to the perimeter of the bar thereby increasing the surface area and bond and the arrangement of the fillets $f$ within these grooves is important in that, in consequence, the fillets do not project outwardly beyond the sides of the body of the bar. As a result of the latter arrangement the bar is of a form adapted to firmly rest upon any flat temporary or other supporting surface. It will also be noted that while the fillets and notches of the bar are arranged in spiral relation, their resisting surfaces are all normal or at right angles to the longitudinal axis of the bar so that there is no tendency of the bar to turn or twist.

In Figs. 8 to 12 there is shown a desirable modification wherein on each side of the bar two straight longitudinal continuous and parallel ribs $c$ $c$ are formed to provide between them the channel or groove $b$. In a similar manner at intervals in the channels the fillets $f$ are arranged and spaced equidistant and in opposing relation to compensating notches $n$ formed in the edges of the body and here also extending into the body of the ribs $c$ $c$ whereby the concrete entering the notches embeds itself in the rib $c$ as well as in the body $a$ of the bar.

In both forms the notches correspond to the fillets, that is, there is exactly as much metal in each fillet as there is displaced or removed to form a notch, and each notch on the edge is balanced by a fillet on the side of the triangle opposite to said edge thus obtaining or preserving absolute uniformity of cross-sectional area of the bar at all points.

The three series of fillets $f$ are staggered as shown, and the three series of notches $n$ are correspondingly staggered. And the fillets and notches of each series are correspondingly spaced so that the space between each adjacent pair of fillets or notches (measured longitudinally) is exactly equal in length to two fillets or notches, which is the result of said deformations being on three sides and staggered as shown, and has the important practical advantage that the spaces in each channel between adjacent fillets form large or elongated pockets, into which the larger fragments of stone in some concrete work will enter, thus giving stronger shearing resistance against movement of the concrete along the steel or turning when under tensional stress, better than obtained with pockets too small to receive the larger aggregates of the concrete.

Notches and fillets equal in number and volume are preferred, that is the amount of metal being displaced to form each notch being equal in amount and volume to that in each fillet but this may be modified and the one or more notches may correspond in volume to a greater or fewer number of fillets, so long as the total volume of the notches and the fillets is the same and the same cross sectional area at all points of the bar is preserved.

In Figs. 13 and 14 are shown a modified form very similar to that of Figs. 8 to 12 but wherein the notches $n$ are formed in the edges of the ribs instead of in the body of the bar.

In Figs. 15 and 16 a further generally similar form of bar is shown wherein the additional ridges and the channel are omitted. As here shown the body of the bar is formed with flat sides and the notches and fillets are provided and arranged in the same relation as in the two forms first described but with the fillets projecting beyond the outer surface of the body.

Figs. 17 and 18 show simple equilateral forms, one with straight sides and the other with curved and the deformations present in the form of striations or roughened surfaces.

Fig. 19 shows another simple form having two ribs $c$ on each side with the longitudinal channel $b$ between, but the ribs are of convex curvature and not angular. Notches and fillets are not shown in this form but it will be readily understood that they may be incorporated in the manner heretofore described so as to preserve the uniformity in the cross-sectional area.

Figure 8:
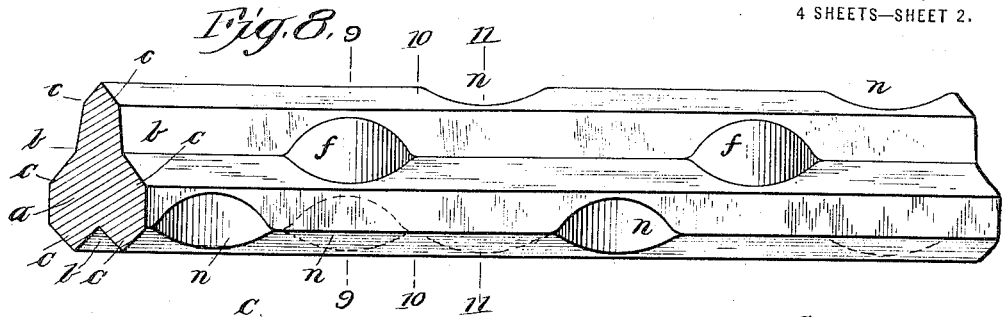
Figure 9:
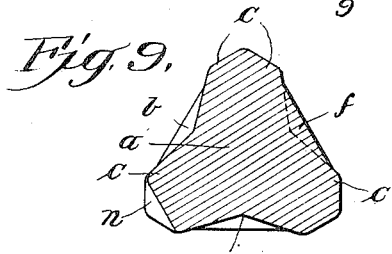
Figure 10:
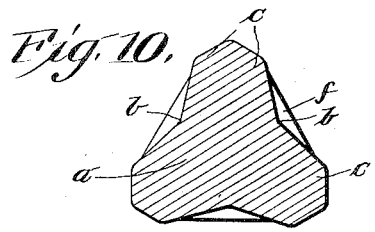
Figure 11:
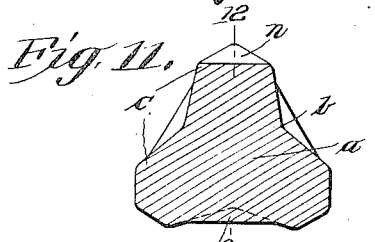
Figure 12:
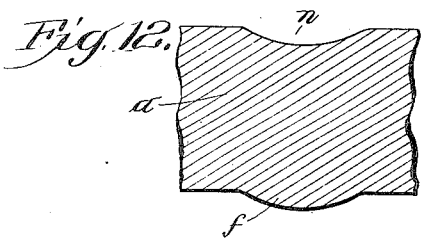
Figure 13:
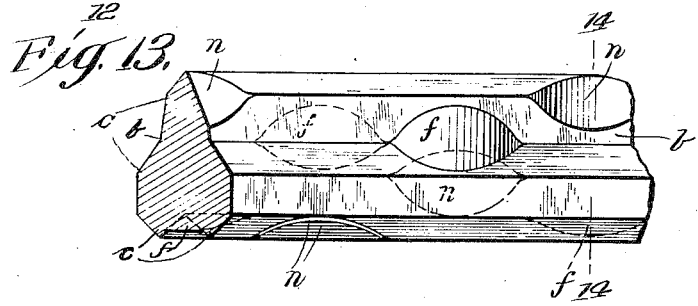
Figure 14:
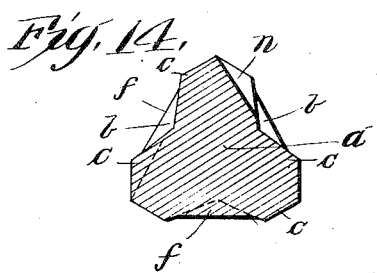

While in the described forms are shown the deformations composed of both notches and fillets in compensating relation it will be understood that either notches or grooves alone may be employed in an arrangement and of a form to preserve the uniform cross-sectional area of the bar. Bars so formed in accordance with the invention are shown in Figs. 20 to 29.

In the form disclosed in Figs. 20 to 22, the deformations are composed of notches $n$ only and they are arranged in suitable relation to preserve the uniform section. In the embodiment here shown the body of the bar of equilateral trangular form is formed on each side with a single central longitudinal ridge or rib. Here there are no fillets and the deformities for producing the mechanical bond consists of the series of notches formed in the ridges as shown and arranged in spiral relation and each notch overlapping the halves of two adjacent notches. As the notches are of uniform contour, the arrangement preserves the uniform cross-sectional area of the bar at all points for as one notch diminishes in depth the two adjacent notches increase and the cross section at any point will show the full depth of one notch or the partial depth of two notches equal thereto in area.

In Figs. 23 to 29, are shown a further modification wherein in a similar relative arrangement fillets alone are employed as the deformations. As illustrated, the body of the bar of substantially equilateral triangular form is formed with its sides of concave curvature in cross section thus forming a longitudinal channel in which the fillets $f$ are arranged. In the described compensating relation the fillets are arranged so that each overlaps the halves of two adjacent fillets and as they are corresponding and uniformly dminish in cross sectional area to each side of their greatest cross sectional area, the uniform cross-sectional area is preserved throughout the length of the bar.

The three sided form of bar based on the triangle is not only desirable because it gives the largest perimeter in proportion to the cross section for adhesive surface but because the center of gravity of a triangular bar is lower, i. e. nearer its base, than that of other bars heretofore invented and in common use, for instance circular, square hexagonal bars etc. and a low center of gravity is desirable as it allows the neutral axis of the bar to be located farther from the top of the beam giving a longer lever arm thus increasing the strength of the beam with a given amount of metal, or for a given strength of beam allowing the use of less metal reinforcement.

The invention may be applied to and may cover various forms of triangular bars of larger or smaller cross sectional area, for instance those having cross-section of an isosceles triangle but the equilateral triangle form is preferred, for such bar is easier and simpler to roll, is symmetrical and may be arranged in the concrete with either of the three sides as the base, making it more convenient to install than other shapes which must be set in a particular position.

I am aware that triangular shaped bars have heretofore been suggested but merely in patents as modifications of and equivalents for square or round bars and the peculiar functions of triangular bars herein described and applied to produce a superior bar have never before been recognized or described. Furthermore such triangular forms as I have seen incidentally suggested are entirely different from the one herein disclosed in form and function and are twisted or are otherwise entirely different from the form now claimed and do not possess the advantages thereof.

Having described the invention what is claimed as new is:

1. A reinforcing bar of the character described comprising a body of triangular cross section and having longitudinally extending channels in its side surfaces and deformations for mechanical bonding arranged in said channels and contained wholly within the channels whereby they are non-projecting therefrom substantially as described.

2. A reinforcing bar of the character described comprising a body of triangular cross section and having longitudinally extending channels in its side surfaces and deformations for mechanical bonding arranged in said channels and contained wholly within the channels whereby they are non-projecting therefrom and said deformations having their resisting surfaces in normal relation to the longitudinal axis of the bar substantially as described.

3. A reinforcing bar of the character described, comprising a body of triangular cross-section and having longitudinally extending channels in its side surfaces and deformations for mechanical bonding arranged in said channels and other deformations arranged in compensating relation thereto to provide a uniform cross sectional area of the bar throughout its length.

4. A reinforcing bar of the character described comprising a body of substantially equi-lateral triangular cross section and having longitudinally extending channels in its side surfaces and deformations for mechanical bonding arranged in said channels and other deformations arranged in compensating relation thereto to provide a uniform cross sectional area of the bar throughout its length and said deformations having their resisting surfaces in normal relation to the longitudinal axis of the bar.

5. A reinforcing bar of the character described, comprising a body of triangular cross-section and having longitudinally extending channels in its side surfaces and deformations for mechanical bonding arranged in said channels and other deformations arranged in compensating relation thereto to provide a uniform cross sectional area of the bar throughout its length, and said deformations having their greatest length extending longitudinally of the bar.

6. A reinforcing bar of the character described comprising a body of triangular cross-section and having longitudinally extending channels in its side surfaces and deformations arranged in compensating relation to maintain a uniform cross sectional area of the bar, said deformations comprising fillets arranged in the channels and notches formed in the edges of the bar in compensating relation to the fillets, substantially as described.

7. A reinforcing bar of the character described comprising a body of triangular cross-section and having longitudinally extending channels in its side surfaces and deformations arranged in compensating relation to maintain a uniform cross sectional area of the bar, said deformations comprising fillets arranged in the channels and notches formed in the edges of the bar in compensating relation to the fillets and said fillets and notches having their greatest length extending longitudinally of the bar.

8. A reinforcing bar of the character described comprising a body of triangular cross-section and having longitudinally extending channels in its side surfaces and deformations arranged in compensating relation to maintain a uniform cross-sectional area of the bar, said deformations comprising fillets arranged in the channels and notches formed in the edges of the bar in compensating relation to the fillets and said fillets and notches having their resisting surfaces arranged in normal relation to the longitudinal axis of the bar and their greatest length extending longitudinally of the bar.

9. A reinforcing bar of the character described comprising a body of equi-lateral triangular cross-section and having longitudinally extending channels in its side surfaces and deformations arranged in compensating relation to maintain a uniform cross-sectional area of the bar, said deformations comprising fillets, arranged in the channels and in spiral relation about the bar and notches formed in the edges of the bar and arranged in opposite and corresponding relation to the fillets to compensate therefor substantially as described.

10. A reinforcing bar of the character described comprising a body of triangular cross-section and having longitudinally extending channels in its side surfaces and deformations for mechanical bonding arranged in said channels and other deformations arranged in compensating relation thereto to provide a uniform cross-sectional area of the bar throughout its length and said deformations being arranged to be non-projecting from the triangular body portion substantially as described.

In testimony whereof I have signed my name to this specification.

LUCILE C. CONKLING,
*Sole executrix of Cloud C. Conkling, deceased.*